United States Patent
Venkateswarlu (10) Patent No.: US 8,761,833 B2
(45) Date of Patent: Jun. 24, 2014

(54) APPARATUS AND METHOD FOR POWER SAVING USING PREDICTIVE POLLING IN A PORTABLE TERMINAL

(75) Inventor: Suraparaju Venkateswarlu, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 263 days.

(21) Appl. No.: 12/777,441

(22) Filed: May 11, 2010

(65) Prior Publication Data

US 2010/0285842 A1 Nov. 11, 2010

(30) Foreign Application Priority Data

May 11, 2009 (KR) ........................ 10-2009-0040811

(51) Int. Cl.
*H04B 1/38* (2006.01)
(52) U.S. Cl.
USPC ............ 455/558; 455/410; 455/411; 370/389
(58) Field of Classification Search
USPC .............. 455/410, 411, 558, 414.1, 418, 419, 455/420, 556.1; 370/389
See application file for complete search history.

(56) References Cited

U.S. PATENT DOCUMENTS

| 7,003,320 | B2 * | 2/2006 | Muller .......................... 455/558 |
| 7,088,988 | B2 * | 8/2006 | Kelkar et al. .................. 455/411 |
| 7,689,231 | B2 * | 3/2010 | Mardiks et al. ............ 455/456.4 |
| 7,844,055 | B2 * | 11/2010 | Mukherjee et al. ........... 380/250 |
| 2005/0221853 | A1 * | 10/2005 | Silvester ....................... 455/551 |
| 2008/0080497 | A1 * | 4/2008 | Meijer et al. .................. 370/389 |
| 2008/0113651 | A1 * | 5/2008 | Choi ............................. 455/411 |
| 2008/0247377 | A1 * | 10/2008 | Van Horn et al. ............. 370/348 |
| 2009/0270130 | A1 * | 10/2009 | Lee et al. ....................... 455/558 |

FOREIGN PATENT DOCUMENTS

FR WO2008150060 A1 * 12/2008 ............... H04B 1/40

* cited by examiner

*Primary Examiner* — Michael Faragalla
*Assistant Examiner* — Gerald Oliver
(74) *Attorney, Agent, or Firm* — Cha & Reiter, LLC (57) ABSTRACT

An apparatus and method for power saving using predictive polling in a portable terminal are provided. A method for predictive polling for a Subscriber Identity Module (SIM) card in a portable terminal includes determining whether a network state of a portable terminal is changed, when the network state is changed, determining whether the portable terminal is in a restricted service state or no-service state, when the portable terminal is in the restricted service state or no-service state, disabling SIM card polling, and when the portable terminal is not in the restricted service state or no-service state, enabling the SIM card polling.

24 Claims, 4 Drawing Sheets

APPARATUS AND METHOD FOR POWER SAVING USING PREDICTIVE POLLING IN A PORTABLE TERMINAL

CLAIM OF PRIORITY

This application claims, under 35 U.S.C.§119(a), priority to and the benefit of the earlier filing date of, that Korean patent application filed in the Korean Intellectual Property Office on May 11, 2009 and assigned Ser. No. 10-2009-0040811, the entire disclosure of which is incorporated by reference, herein.

BACKGROUND OF THE INVENTION

1. Field of the Invention

The present invention relates to the field of portable terminals and more particularly to an apparatus and method for reducing battery power consumption and Central Processing Unit (CPU) utilization rate in a portable terminal.

2. Description of the Related Art

SIM (Subscriber Identity Module) polling makes it possible to identify SIM card installation or non-installation in a portable terminal and makes it possible for a user to use a network service.

SIM card removal or non-removal is identified at an interval of 30 seconds in accordance with the $3^{rd}$ Generation Partnership Project (3GPP) standard Technical Specification (TS) 31.101 (see www.3GPP.org) In addition, a Universal Integrated Circuit Card (UICC) is another technology that can include several cards such as a Universal SIM (USIM) card, a SIM card, etc. that may be used to provide several kinds of services in a portable terminal.

In order to identify SIM card installation or non-installation, there is a need for polling between a SIM card and a portable terminal. This polling is carried out regardless of the type of an installed card, i.e., basic SIM card, a USIM card, etc. and regardless of a mode (e.g., a Packet Switched (PS) mode, a Circuit Switched (CS) mode, a SIM card access mode) of the portable terminal.

Typically, the portable terminal is mostly in an idle state except when being in voice call telephony or using a packet call (e.g., data transmission). However, even in the idle state, much polling occurs between the portable terminal and the SIM card. This is a cause of a waste of resources of a controller (i.e., a CPU) of the portable terminal.

This unnecessary polling consumes system resources or controller resources, thus increasing battery power consumption and problematically reduces a time of the use of the portable terminal.

SUMMARY OF THE INVENTION

An aspect of the present invention is to provide an apparatus and a method for apparatus and method for power saving using predictive polling in a portable terminal.

An aspect of the present invention is to provide an apparatus and method for power saving using predictive polling in a portable terminal.

Another aspect of the present invention is to provide an apparatus and method for preventing unnecessary polling between a controller and a Subscriber Identity Module (SIM) card or a UICC using a predictive polling technique to reduce battery power in a portable terminal.

A further aspect of the present invention is to provide an apparatus and method for preventing unnecessary polling between a controller and a SIM card using a predictive polling technique to reduce a controller utilization rate in a portable terminal.

A further aspect of the present invention is to provide an apparatus and method for increasing a time of a use of a portable terminal through battery power saving using a predictive polling technique in a portable terminal.

The above aspects are achieved by providing an apparatus and method for power saving using predictive polling in a portable terminal.

According to one aspect of the present invention, a method for predictive polling for a Subscriber Identity Module (SIM) card in a portable terminal is provided. The method includes determining whether a network state of a portable terminal is changed, when the network state is changed, determining whether the portable terminal is in at least one of: a restricted service state and a no-service state, when the portable terminal is in at least one of a restricted service state and a no-service state, disabling SIM card polling, and when the portable terminal is not in at least one of a restricted service state and a no-service state, enabling the SIM card polling.

According to another aspect of the present invention, an apparatus for predictive polling for a SIM card in a portable terminal is provided. The apparatus includes a controller determining whether a network state of a portable terminal is changed and, when the network state is changed, determining whether the portable terminal is in at least one of: a restricted service state and a no-service state and, when the portable terminal is in at least one of a restricted service state and a no-service state, disabling SIM card polling and, when the portable terminal is not in at least one of a restricted service state and a no-service state, enabling the SIM card polling.

According to a further aspect of the present invention, a method for setting predictive polling for a SIM card in a portable terminal is provided. The method includes, disabling SIM card polling after determining a network state of the portable terminal is changed and the portable terminal is in at least one of a restricted service state and a no-service state, and enabling the SIM card polling when the portable terminal is not in at least one of a restricted service state and a no-service state.

According to a yet another aspect of the present invention, an apparatus for being capable of setting predictive polling for a SIM card in a portable terminal is provided. The apparatus includes a controller for determining when a network state of the portable terminal is changed and performing one of: disabling SIM card polling when the portable terminal is in at least one of a restricted service state and a no-service state, and enabling the SIM card polling when the portable terminal is not in at least one of a restricted service state and a no-service state.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The following description is made for an apparatus and method for power saving using predictive polling in a portable terminal. In the following description, a Subscriber Identity Module (SIM) card is illustration of one exemplary embodiment of the present invention, and an object of the present invention can not only be a SIM card but also a Universal SIM (USIM) card, a Universal Integrated Circuit Card (UICC), etc. Thus, the present invention generally refers to the term "a SIM card" as being associated with one of a SIM card, a USIM card, and a UICC, or other similar means for identifying a subscriber and/or functions operable in a portable terminal.

Figure 1:
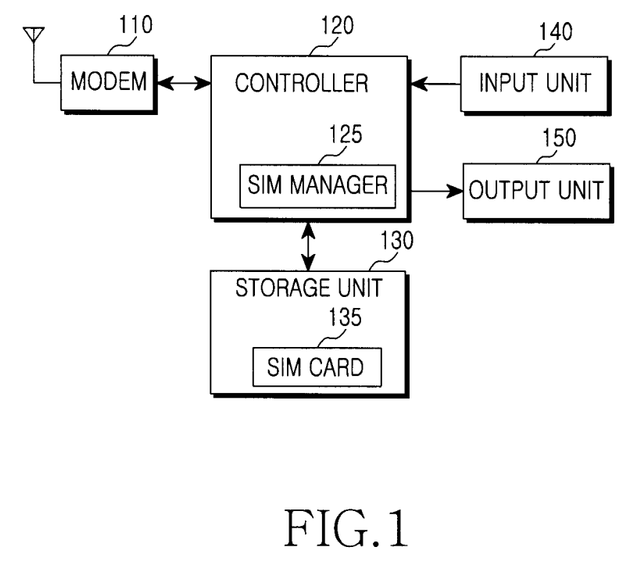
FIG. 1 is a block diagram illustrating a construction of a portable terminal according to an exemplary embodiment of the present invention.

FIG. 1 is a block diagram illustrating a construction of a portable terminal according to an exemplary embodiment of the present invention.

Referring to FIG. 1, the portable terminal includes a modem 110, a controller 120, a storage unit 30, an input unit 140, and an output unit 150.

The modem 110 is a module for communicating with other devices, and includes a radio processor, a baseband processor, etc., which are not shown but are well-known in the art. The radio processor converts a signal, which is received through an antenna, into a baseband signal and provides the baseband signal to the baseband processor. In addition, the radio processor converts a baseband signal from the baseband processor into a radio signal such that the radio signal can be transmitted through the antenna.

The controller 120 controls a general operation of the portable terminal. For example, the controller 120 performs processing and control for voice telephony and packet communication. Particularly, the controller 120 controls a SIM manager 125 according to the present invention. A description of general processing, e.g., booting, event scheduling, event process, etc., and control of the controller 120 is well-known and need not be described in detail herein.

The input unit 140 represents a plurality of input means such as a key pad, a touch pad, a touch screen, etc., and provides data input by a user to the controller 120.

The output unit 150, which may represent a display unit, displays state information generated during an operation of the portable terminal, a limited number of characters, a large amount of moving pictures and still pictures, etc. The output unit 150 can be a color Liquid Crystal Display (LCD), which is typical of a portable terminal, but may also be represented as Light Emitting Diode (LED) display or an OLED (Organic LED).

The storage unit 130, includes a memory (not shown) performs a function of storing a program for controlling a general operation of the portable terminal, and temporary data generated in execution of a program. Particularly, the storage unit 130 includes a SIM card 135 according to the present invention.

The SIM manager 125, which is called a Toolkit', is a function module for accessing the SIM card 135. The SIM manager 125 efficiently enables polling with the SIM card 135 to reduce the battery power consumption of the portable terminal. An operation of the SIM card 135 is described below in detail.

In the aforementioned construction, the controller 120 can perform a function of the SIM manager 125. These are separately constructed and shown to distinguish and describe respective functions in the present invention. Thus, when a product is actually realized, the product can be constructed such that the controller 120 can process all of the functions of the SIM manager 125. Alternately, the product can be constructed such that the controller 120 can process only part of the SIM manager 125.

Figure 2:
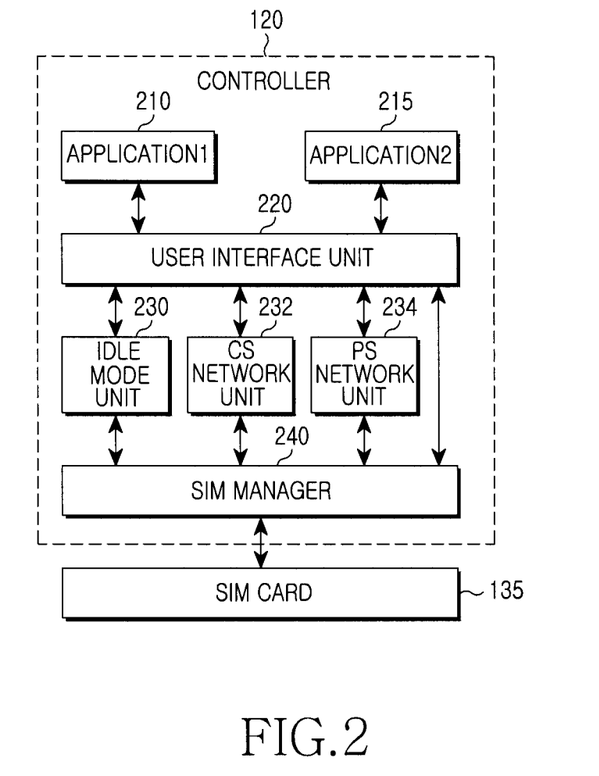
FIG. 2 is a diagram illustrating an example of an operation between a controller and a Subscriber Identity Module (SIM) card according to an exemplary embodiment of the present invention.

FIG. 2 is a diagram illustrating an example of an operation between a controller 120 and a SIM card 135 according to an exemplary embodiment of the present invention.

Referring to FIG. 2, the controller 120 of a portable terminal includes a SIM manager 240, an application1 210, an application2 215, a user interface unit 220, an idle mode unit 230, a Circuit Switched (CS) network unit 232, a Packet Switched (PS) network unit 234, etc., which each operate as software processes.

The SIM manager 240 provides a function necessary for accessing the SIM card 135 to other software processes. That is, the SIM manager 240 performs a role of an interface.

The application1 210 and the application2 215 communicate with the corresponding software processes 230, 232, and 234 through the user interface unit 220. Alternately, the application1 210 and the application2 215 can communicate with the SIM manager 240 through the user interface unit 220 and access the SIM card 135.

In case that the application1 210 takes charge of a voice call service, the application1 210 communicates with the CS network unit 232 through the user interface unit 220 to provide the voice call service to a user.

In case that the application2 215 takes charge of a packet call service, the application2 215 communicates with the PS network unit 234 through the user interface unit 220 to provide the packet call service to a user.

In case that the portable terminal is in an idle state, the idle mode unit 230 controls the portable terminal, and exchanges necessary information with a network.

In this case, the idle mode unit 230, the CS network unit 232, and the PS network unit 234 access the SIM card 135 through the SIM manager 240. Particularly, in the present invention, the SIM manager 240 enables polling for the SIM card 135 according to a proposed scheme of the present invention.

Figure 3:
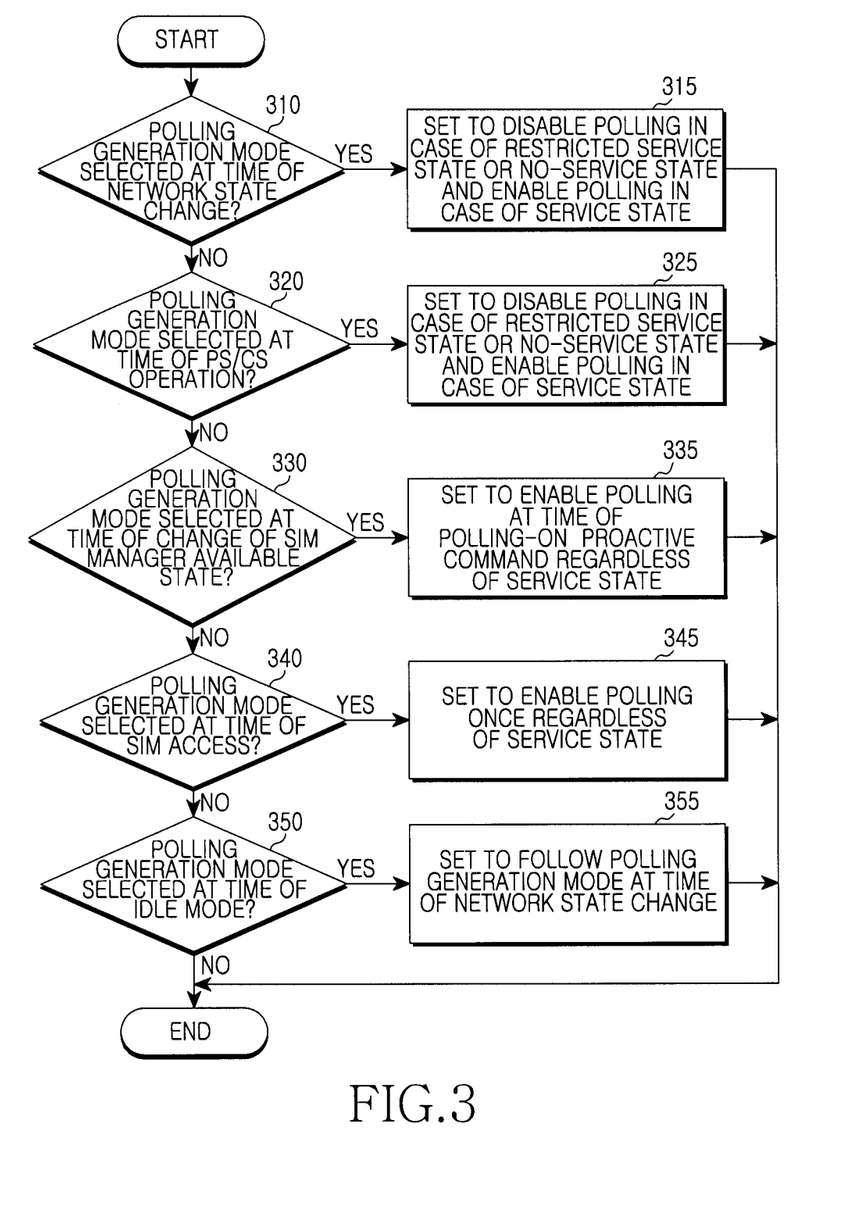
FIG. 3 is a flow diagram illustrating a process of setting a predictive polling function according to an exemplary embodiment of the present invention.

FIG. 3 is a flow diagram illustrating a process of setting a predictive polling function according to an exemplary embodiment of the present invention.

In FIG. 3, the setting of the predictive polling function of the present invention will be implemented by a service provider or a portable terminal manufacturer rather than a general user because of its characteristic.

If a polling generation mode is selected at the time of a network state change in step 310, the controller sets a polling mode to disable polling when the portable terminal is in a restricted service state or no-service state and enable the polling when the portable terminal is in a service state in step 315.

Here, the network state change represents a change of network state information due to updating of a location of the portable terminal.

If the polling generation mode is selected at the time of PS/CS operation in step 320, the controller sets the polling mode to disable the polling when the portable terminal is in the restricted service state or no-service state and enable the polling when the portable terminal is in the service state in step 325.

Here, the PS operation represents a case that the portable terminal is provided with a packet call service, and the CS operation represents a case that the portable terminal is provided with a voice call service.

If the polling generation mode is selected at the time of a change of a SIM manager available state in step 330, the controller sets the polling mode to enable the polling only at the time of generation of a polling-on proactive command regardless of a service state in step 335.

Here, the SIM manager available state represents the condition whether the SIM manager is usable or unusable. The polling-on proactive command is a command for triggering polling generation between the SIM manager 125 and the SIM card 135.

If the polling generation mode is selected at the time of SIM access in step 340, the controller 120 sets the polling mode to enable the polling once regardless of the service state in step 345.

Here, the SIM access represents a case that the controller accesses a file (e.g., a list of phone numbers) stored in the SIM card.

If the polling generation mode is selected at the time of an idle mode in step 350, the controller sets the polling mode to follow the polling generation mode (step 310) of the time of the network state change in step 355.

Figure 4:
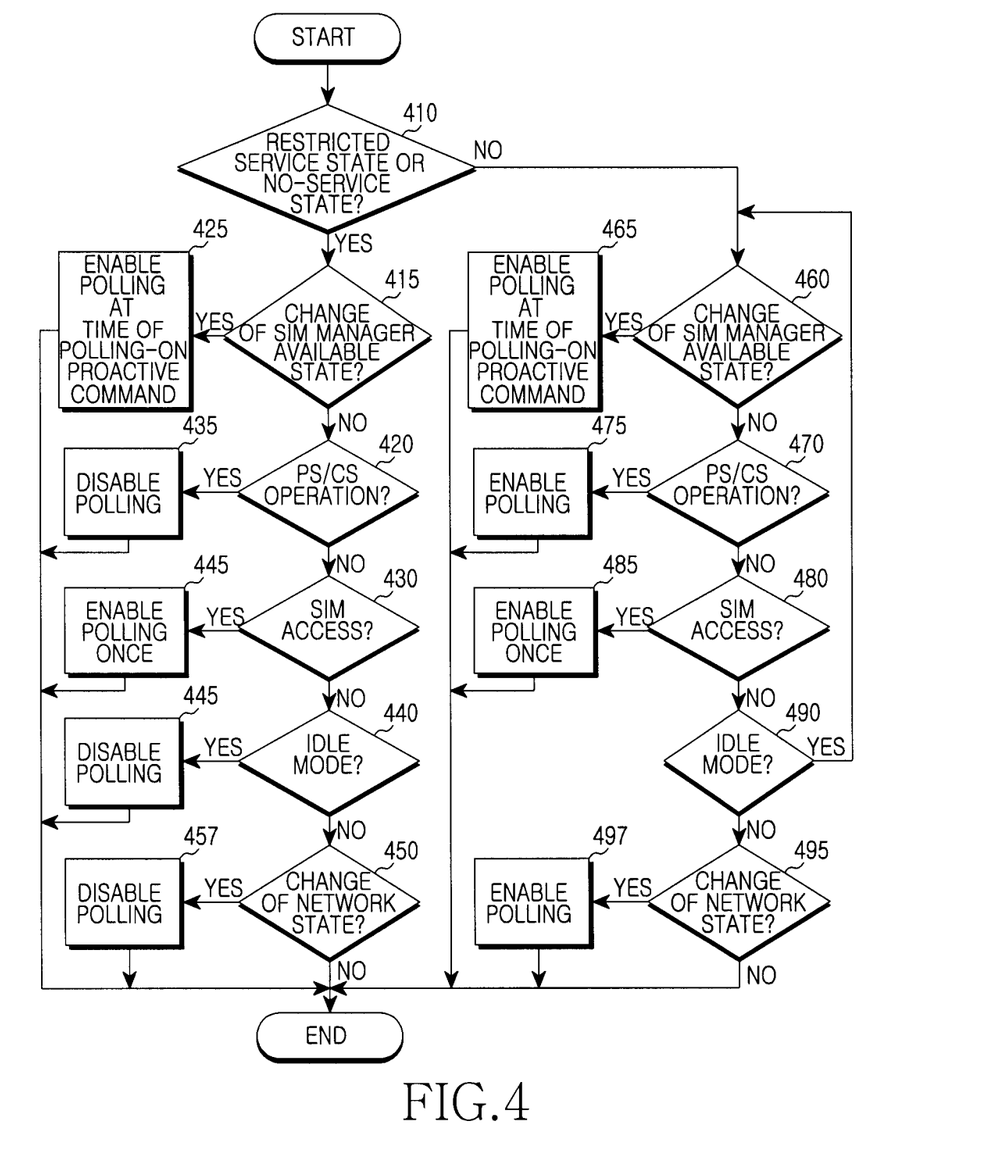
FIG. 4 is a flow diagram illustrating a process of driving a predictive polling function according to an exemplary embodiment of the present invention.

FIG. 4 is a flow diagram illustrating a process of driving a predictive polling function according to an exemplary embodiment of the present invention.

Referring to FIG. 4, if a current service state is in a restricted service state or no-service state in step 410, processing proceeds to step 415 where a determination is made whether the SIM manager available state has changed. If the available state has changed, the controller enables the polling only at the time of generation of a polling-on proactive command at step 425.

If the available state has not changed, then processing proceeds to step 435 wherein a determination is made whether a PS/CS operation is in progress. In this case, the controller disables the polling in step 435.

If a PS/CS operation is not in progress, then a determination is made whether a SIM access has been made. If a SIM access has been made, then the controller enables the polling just once in step 445.

However, if a SIM access has not been made, then a determination is made at step 440 whether the portable terminal is in an idle mode. If the idle mode is determined, then the controller disables polling in step 455.

However, if the portable terminal is not in an idle mode, then a determination is made whether a network state change has occurred at step 450. If a network state change has occurred, then the controller disables polling at step 457.

Returning to step 410, if the current service state is not in a restricted service state or a no-service state but in another service state, processing proceeds to step 460, where a determination is made whether a SIM manager available state has changed. If the available state has changed, then the controller enables polling only at the time of generation of a polling-on proactive command in step 465.

However, if the available state has not changed, a determination is made whether a PS/CS operation is in progress at step 470. If the PC/CS operation is in progress, then the controller enables general polling at step 475.

However, if a PS/CS is not in progress, then a determination is made whether a SIM access has been made at step 480. If a SIM access has been made, then the controller enables the polling just once in step 485.

However, if the SIM access has not been made, then a determination is made whether the portable terminal is in an idle mode at step 490. If the terminal is in an idle mode, then processing proceeds to step 460.

However, if the terminal is not in an idle mode, then a determination is made at step 495 whether a network state is changed. If a network state change has occurred, the controller enables the polling in step 497. That is, the controller enables general polling.

The summary description of the processing shown in FIG. 4 is now provided.

The controller of the portable terminal determines if the network state is changed. If the network state is changed, the controller determines if the portable terminal is in a restricted service or no-service state. If the portable terminal is in the restricted service or no-service state, the controller disables SIM card polling and, if the portable terminal is not in the restricted service or no-service state, the controller enables the SIM card polling.

The controller of the portable terminal determines if a SIM card access is generated. If the SIM card access is generated, the controller enables the SIM card polling just once regardless of a service state.

The controller of the portable terminal determines if a SIM card manager available state is changed. If the SIM card manager available state is changed, the controller enables the polling only at the time of generation of a polling-on proactive command.

In case that the portable terminal is in a voice call or packet call service mode, if the portable terminal is in a restricted service or no-service state, the controller of the portable terminal disables the SIM card polling. If the portable terminal is not in the restricted service or no-service state, the controller enables the SIM card polling.

In case that the portable terminal is in an idle mode, if the portable terminal is in the restricted service or no-service state, the controller of the portable terminal disables the SIM card polling. If the portable terminal is not in the restricted service or no-service state, the controller enables the polling only at the time of generation of a polling-on proactive command.

An exemplary embodiment of the present invention has an advantage of preventing unnecessary polling between a controller and a SIM card using a predictive polling technique and reducing the battery power consumption of a portable terminal, thus f increasing a time of a use of the portable terminal.

The above-described methods according to the present invention, which can be executed by the controller, can be realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software using a controller containing a general purpose computer, or a special processor or in programmable or dedicated hardware, such as an ASIC or FPGA. As would be understood in the art, the controller, the computer, the processor or the programmable hardware include memory components, e.g., RAM, ROM, Flash, etc. that may store or receive software or computer code, which when accessed and executed by the computer, processor or hardware, implement the processing methods described herein. The code when loaded into a general purpose computer transformed the general purpose computer into a special purpose computer that may in part be dedicated to the processing shown herein. In addition, the controller, computer, processor or dedicated hardware may be composed of at least one of a single processor, a multi-processor, and a multi-core processor.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method, operable in a controller, for predictive polling for a Subscriber Identity Module (SIM) card in an electronic device, the method comprising:
   determining, by a controller, whether a network state of a portable terminal is changed;
   responsive to the network state being changed, determining, by the controller, whether the electronic device is in at least one of: a restricted service state of operation and a no-service state of operation;
   after the electronic device is placed in at least one of: the restricted service state of operation and the no-service state of operation, disabling, by the controller, only SIM card polling performed by a SIM manager; and
   when the portable terminal is not in at least one of: the restricted service state of operation and the no-service state of operation, enabling, by the controller, the SIM card polling by the SIM manager.

2. The method of claim 1, wherein determining whether the network state is changed comprises determining whether location information of the electronic device has changed.

3. The method of claim 1, further comprising:
   determining, by the controller, whether a SIM card access is generated; and
   enabling, by the controller, the SIM card polling once regardless of a service state of the electronic device when the SIM card access is generated.

4. The method of claim 1, further comprising:
   determining, by the controller, whether a SIM card manager available state is changed; and
   enabling, by the controller, the polling at the time of generation of a polling-on proactive command regardless of a service state of the electronic device when the SIM card manager available state is changed.

5. The method of claim 1, further comprising:
   disabling, by the controller, the SIM card polling when the electronic device is in at least one of a voice call and packet call service in the at least one of a restricted service state and a no-service state; and
   enabling, by the controller, the SIM card polling when the electronic device is not in at least one of: a restricted service state and a no-service state.

6. The method of claim 1, further comprising: in case that the electronic device is in an idle mode,
   disabling, by the controller, the SIM card polling when the electronic device is in the restricted service state or no-service state; and
   enabling, by the controller, the polling at the time of generation of a polling-on proactive command when the electronic device is not in the restricted service or no-service state.

7. An apparatus for predictive polling for a Subscriber Identity Module (SIM) card in a electronic device, the apparatus comprising:
   a controller: determining whether a network state of a electronic device is changed and, responsive to the network state being changed, determining whether the electronic device is in at least one of a restricted service state of operation and a no-service state, of operation, and, after the electronic device is placed in at least one of a restricted service state of operation and the no-service state operation, disabling only SIM card polling performed by a SIM manager and, when the portable terminal is not in at least one of a restricted service state of operation or the no-service state of operation, enabling the SIM card polling performed by the SIM manager.

8. The apparatus of claim 7, wherein the controller determines whether the network state is changed by determining whether location information of the electronic device has changed.

9. The apparatus of claim 7, wherein the controller determines whether a SIM card access is generated and, when the SIM card access is generated, the controller enables the SIM card polling once regardless of a service state of the electronic device.

10. The apparatus of claim 7, wherein the controller determines whether a SIM card manager available state is changed and, when the SIM card manager available state is changed, the controller enables the polling at the time of generation of a polling-on proactive command regardless of a service state of the electronic device.

11. The apparatus of claim 7, wherein, in case that the electronic device is in one of: a voice call and a packet call service, the controller disables the SIM card polling when the electronic device is in at least one of a restricted service state and a no-service state, and enables the SIM card polling when the electronic device is not in at least one of a restricted service and a no-service state.

12. The apparatus of claim 7, wherein, in case that the electronic device is in an idle mode, the controller disables the SIM card polling when the electronic device is in at least one of a restricted service and a no-service state, and enables the polling at the time of generation of a polling-on proactive command when the electronic device is not in at least one of a restricted service and a no-service state.

13. A method, operable in a controller, for setting predictive polling for a Subscriber Identity Module (SIM) card in a electronic device, the method comprising:
disabling, by a controller, only SIM card polling performed by a SIM manager in response to determining that a network state of the electronic device is changed and after the electronic device is placed in at least one of a restricted service state of operation and a no-service state of operation; and
enabling, by the controller, the SIM card polling performed by the SIM manager when the portable terminal is not in at least one of the restricted service state of operation and the no-service state of operation.

14. The method of claim 13, wherein the change of the network state comprises a change of location information of the electronic device.

15. The method of claim 13, further comprising, setting, by the controller, to enable the SIM card polling once regardless of a service state of the electronic device when a SIM card access is generated.

16. The method of claim 13, further comprising, setting, by the controller, to enable the SIM card polling only at the time of generation of a polling-on proactive command regardless of a service state when the SIM card manager available state is changed.

17. The method of claim 13, further comprising:
determining, by the controller, whether the electronic device is in a voice call or packet call service.

18. The method of claim 13, further comprising:
determining, by the controller, whether the electronic device is in an idle mode and performing one of:
disabling, by the controller, the SIM card polling when the electronic device is in at least one of a restricted service state and a no-service state; and
enabling, by the controller, the polling only at the time of a polling-on proactive command when the electronic device is not in at least one of a restricted service state and a no-service state.

19. An apparatus for setting predictive polling for a Subscriber Identity Module (SIM) card in an electronic device, the apparatus comprising:
a controller for:
determining when a network state of the electronic device is changed; and
performing, in response to the determination of a change in the network state, one of:
disabling only SIM card polling performed by a SIM manager after the electronic device is placed in at least one of a restricted service state of operation and a no-service state of operation, and
enabling the SIM card polling performed by the SIM manager when the portable terminal is not in at least one of the restricted service state of operation and the no-service state of operation.

20. The apparatus of claim 19, wherein the change of the network state comprises a change of location information of the electronic device.

21. The apparatus of claim 19, wherein the controller enables the SIM card polling once regardless of a service state of the electronic device when a SIM card access is generated.

22. The apparatus of claim 19, wherein the controller enables the polling at the time of generation of a polling-on proactive command regardless of a service state of the electronic device when the SIM card manager available state is changed.

23. The apparatus of claim 19, wherein the controller further comprises:
determining whether the electronic device is in one of a voice call and packet call service.

24. The apparatus of claim 19, wherein the controller further comprises:
determining whether the electronic device is in an idle mode, and performing one of:
disabling the SIM card polling when the electronic device is in at least one of a restricted service state and a no-service state, and
enabling the polling at the time of a polling-on proactive command when the electronic device is not in at least one of a restricted service state and a no-service state.

* * * * *

UNITED STATES PATENT AND TRADEMARK OFFICE
CERTIFICATE OF CORRECTION

| | | |
|---|---|---|
| PATENT NO. | : 8,761,833 B2 | Page 1 of 1 |
| APPLICATION NO. | : 12/777441 | |
| DATED | : June 24, 2014 | |
| INVENTOR(S) | : Suraparaju Venkateswarlu | |

It is certified that error appears in the above-identified patent and that said Letters Patent is hereby corrected as shown below:

In the Claims

Column 7, Claim 1, Lines 51-52 should read as follows:
--...state of the electronic device is...--

Column 8, Claim 7, Line 32 should read as follows:
--...in an electronic device...--

Column 8, Claim 7, Lines 34-35 should read as follows:
--...of the electronic device...--

Column 8, Claim 7, Line 38 should read as follows:
--...no-service state of...--

Column 8, Claim 7, Lines 39-40 should read as follows:
--...of the restricted service...--

Column 8, Claim 7, Line 43 should read as follows:
--...of the restricted service...--

Column 9, Claim 13, Lines 9-10 should read as follows:
--...in an electronic device...--

Signed and Sealed this
Second Day of September, 2014

Michelle K. Lee
*Deputy Director of the United States Patent and Trademark Office*